F. NUNEZ.
SEPARATOR FOR SPLITTING ESSENTIAL OILS.
APPLICATION FILED JAN. 14, 1914.

1,125,590.

Patented Jan. 19, 1915.
2 SHEETS—SHEET 2.

WITNESSES

INVENTOR
Frank Nunez
BY
ATTORNEYS

UNITED STATES PATENT OFFICE.

FRANK NUNEZ, OF NEWARK, NEW JERSEY.

SEPARATOR FOR SPLITTING ESSENTIAL OILS.

1,125,590.   Specification of Letters Patent.   Patented Jan. 19, 1915.

Application filed January 14, 1914.   Serial No. 812,040.

*To all whom it may concern:*

Be it known that I, FRANK NUNEZ, a cittzen of Mexico, and a resident of the city of Newark, in the county of Essex and State of New Jersey, have invented a new and Improved Separator for Splitting Essential Oils, of which the following is a full, clear, and exact description.

My invention relates to a device for splitting essential oils into soluble and insoluble parts; and the object thereof is to provide a simple and efficient device for separating the soluble part of essential oils from the insoluble part.

I attain the above splitting of essential oils by placing into my device a mixture of essential oil, or its alcoholic dilution, mixed or triturated with an inert powder and water to form a semi-fluid or paste in which essential oil is exposed in minute particles, forcing hot water into the apparatus through the paste, which water will carry off the soluble part of the essential oils. The apparatus causes the so-infused water to circulate therein so as to prevent the insoluble part of the essential oils from being carried off by the water.

Figure 1:
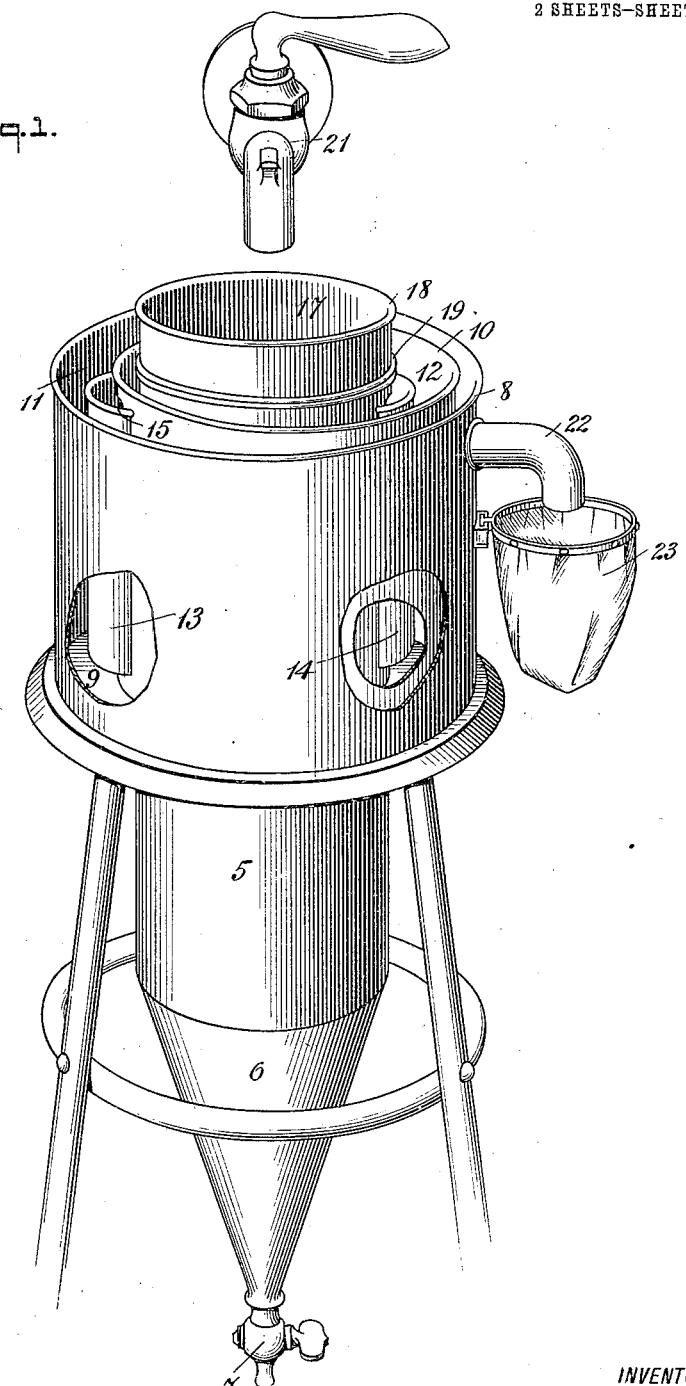
Figures 2, 3:
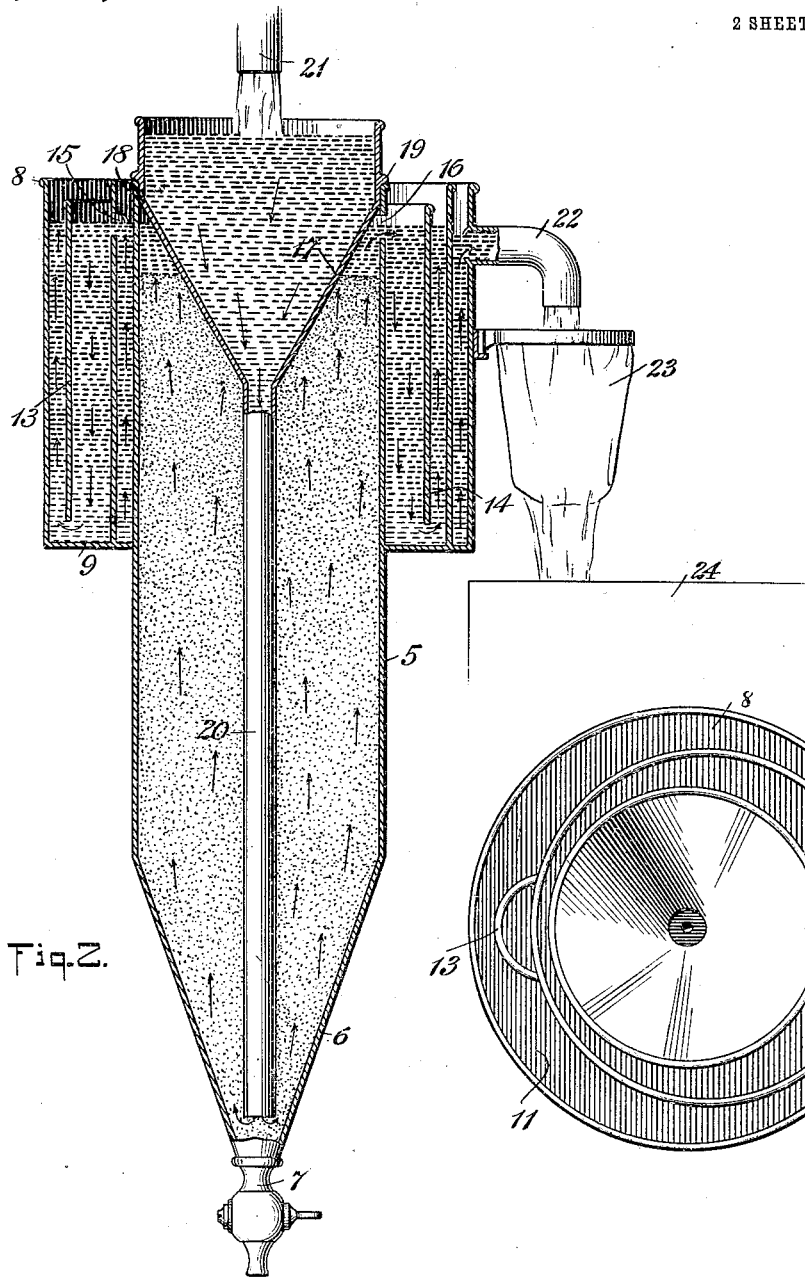

The apparatus used for the purpose is illustrated in the accompanying drawings, in which:

Figure 1 is a perspective view of the same; Fig. 2 is a vertical, axial section therethrough; and Fig. 3 is a plan view of the same.

Before proceeding to a more detailed description of my apparatus for splitting essential oils, it must be clearly understood that while essential oils, or other dilutions with alcohol, are preferably used in connection with the said apparatus, alcoholic percolations of aromatic plants or parts of plants (leaves, flowers, roots, etc.) can be used with the apparatus, in which case the plants are comminuted or coarsely ground before the same are used in the apparatus.

Referring to the drawings, 5 represents an elongated receptacle, preferably cylindrically shaped, and having a cone-shaped bottom 6 at the apex of which a valve-controlled outlet 7 is formed.

Encompassing the said receptacle adjacent the upper end is a receptacle 8 concentric therewith and having its open top flush with the top of the receptacle 5 and its bottom 9 so secured to the lateral surface of the said receptacle 5 as to form a tight joint therebetween.

Positioned within the receptacle 8 is an annular member 10 eccentric with said receptacle and having its upper end flush with the top of the said receptacles 5 and 8 and its lower edge so joined to the bottom 9 of the receptacle 8 as to separate said receptacle into two annular parts 11 and 12. The said annular parts, due to the eccentricity of the said annular member 10, vary in width on opposite sides and thereby afford in the largest part thereof the provision of channeled portions 13 and 14 carried on the exterior lateral surface of the annular member 10 and the receptacle 5 respectively within the said respective annular parts 11 and 12. The said channeled portions 13 and 14 do not extend to the bottom 9 of the receptacle 8 and thereby constitute directors or conduits from the corresponding outlets 15 and 16 into the corresponding annular parts 11 and 12, of which the outlet 16 is on the lateral surface of the receptacle 5 adjacent the top thereof, and the outlet 15 on the lateral surface of the annular member 10 similarly positioned.

A funnel 17 provided with a cylindrical portion 18 fits snugly into the receptacle 5. Said cylindrical portion on its exterior lateral surface is provided with a shoulder 19 adapted to rest on the upper edge of the receptacle 5, whereby said funnel is supported by the receptacle 5. The tubular portion 20 of the funnel 17 is extended adjacent the outlet 7 of the bottom 6 of the receptacle 5, whereby water coming through the funnel is caused to rise through substantially the entire length of the receptacle 5 before the same can escape therefrom.

The essential oils, or their alcoholic dilutions, are mixed or triturated with the inert powder to a semi-fluid or paste, whereby the mass of oil is subdivided into small particles carried by the powder, thus affording a large area of attack on said particles of oil. The inert powder that can be used for forming the mixture can be pumice, magnesium carbonate, calcium phosphate, kieselghur, or any other similar substance. When the mixture is in a paste form the same is placed directly into the receptacle 5 by removing the funnel 17 from the top of the receptacle. In using the said mixture in a semi-fluid state, the same can be placed into receptacle 5 through the funnel 17. When the mixture of the oil with the inert powder is placed in the receptacle 5, as shown in Fig. 2, hot water is poured into the funnel 17, preferably at a constant rate, from any suitable vessel having a controllable outlet, as shown at 21. The hot water from the funnel passes through the entire mass formed by the oil and the inert substance before it can escape into the annular part 12 of the receptacle 8. In passing through the said mass it attacks the particles of oil carried by the inert substance and splits them by dissolving the soluble portion and leaving the insoluble portion on the grains of the inert powder, to which the said insoluble parts adhere. The water infused with the soluble part of the essential oil is forced by the conduit or director 14 to travel to the bottom 9 before it can enter the annular part 12 of the vessel 8, thereby any insoluble particles that may be carried by the hot water passing through the receptacle 5 will be deposited at the bottom of said annular portion. Similarly, the infused fluid, before it can enter into the annular part 11, is forced by the director 13 to traved toward the bottom and, therefore, also permitting the insoluble part to settle at the bottom of said part. The infused water flowing through the outlet of the annular part 11 is directed into a strainer 23, preferably removably secured to the receptacle 8. The purpose of using the strainer at the outlet of the receptacle 8 is to prevent any insoluble matter that may be carried by the water from entering the receptacle 24 for the infused water. The reason for providing the consecutive outlets on opposite sides of the receptacles is to increase the path of flow so as to give time for the insoluble particles carried by the water to settle at the bottom of the receptacle.

If desired, the funnel 17, in place of the shoulder 19, may be provided with a flange (not shown in the drawing) to form a cover for the receptacle 8. The funnel 17 may also be provided with a perforated flange portion to be carried by the cone-shaped portion of the funnel and adapted to fit snugly into the receptacle 5, so as to resist the floating of the upper surface of the mixture into the receptacle 5.

The semi-fluid or paste in the receptacle 5 can be washed out therefrom by opening the valve 7 at the bottom thereof. The entire device can be easily and quickly cleaned by removing it from the stand and forcing water through all the receptacles; and the directors and conduits can also be easily cleaned in view of the fact that they are open at the upper end and, therefore, water can be poured therethrough, so that the entire device is rendered sanitary by the facility with which the same can be cleaned.

From the above it will be seen that the essential of my invention is to form a paste or semi-fluid from essential oil with a powder of some inert substance, then force hot water through the mass to infuse the same with the soluble part of the essential oil and cause the so-infused water to flow in a predetermined path, whereby any insoluble particles carried by the infused water are separated therefrom.

Having thus described my invention, I claim as new and desire to secure by Letters Patent:

1. In a device for infusing liquid with essential oils, a pair of concentric receptacles; an annular member in the outer receptacle dividing the same into two parts; means associated with the inner receptacle and the annular member for causing the liquid flowing from the inner receptacle through the outer to descend to the bottom of said parts of the outer receptacle before the said liquid can rise to the top thereof, said means being so formed that they can be flushed from the top; and a funnel associated with the inner receptacle and having a tubular extension to the bottom thereof, substantially as and for the purpose set forth.

2. In a device for infusing liquids with essential oils, a pair of concentric receptacles; an annular member in the outer receptacle eccentric therewith dividing said receptacle into an inner and an outer part thereof, the inner receptacle having an outlet at the top thereof into said inner part of the outer receptacle, and said inner part having an outlet into the outer part; guiding means associated with the outlets from the inner receptacle and the inner part for directing the liquid flowing therethrough to the bottom of the outer receptacle; and means associated with the inner receptacle forming an inlet therethrough at the bottom thereof whereby the inflowing liquid is caused to flow through the entire inner receptacle before it can enter the inner part of the outer receptacle.

3. In a device for infusing liquids with essential oils, a pair of concentric receptacles; an annular member dividing the outer receptacle into an inner and an outer eccentric part, the inner receptacle having an outlet at the top thereof into the inner part of the said outer receptacle, and the said inner part having an outlet into the outer part of said inner receptacle; guiding means for causing the liquid flowing through the outlets of said inner receptacle and the inner part of the outer receptacle to descend toward the bottom of said outer receptacle before the same can rise to the top thereof; and means associated with the inner receptacle forming a fluid inlet at the bottom thereof whereby the fluid is forced to rise through the entire receptacle before it can escape into the inner part of the outer receptacle.

4. In a device for infusing liquids with essential oils, a pair of concentric receptacles; an annular member in the outer receptacle dividing the same into an inner and outer eccentric part; guiding means positioned in the widest portion of each of said eccentric parts, the inner receptacle having an outlet at the top thereof communicating with said guiding means in the inner eccentric part of the outer receptacle, the said inner part having an outlet at the top thereof communicating with the guiding means positioned in the outer eccentric part of said outer receptacle, said guiding means forcing the fluid inflowing through the corresponding outlets to descend toward the bottom of the outer receptacle before it can rise toward the top thereof, said outer receptacle having an outlet at the top thereof, said guiding means in said eccentric parts of the outer receptacle being open at the top thereof, whereby said guiding means can be flushed through the top; and a funnel associated with the inner receptacle and having a tubular extension to the bottom thereof whereby a liquid entering said funnel enters the inner receptacle at the bottom and flows through the entire receptacle before it can enter the inner eccentric part of the outer receptacle.

5. In a device for infusing liquids with essential oils, a pair of concentric receptacles, the inner receptacle having its bottom projecting below the bottom of the outer receptacle; an annular member in the outer receptacle dividing the same into two parts; means associated with the inner receptacle and the annular member for causing the liquid flowing from the inner receptacle to the outer to descend to the bottom of said parts of the outer receptacle before the said liquid can rise to the top thereof; and means associated with the inner receptacle forming a fluid inlet at the bottom thereof substantially as and for the purpose set forth.

6. In a device for infusing liquids with essential oils, a pair of concentric receptacles, the inner receptacle projecting through the bottom of the other receptacle; an annular member in the outer receptacle dividing the same into an inner and an outer eccentric part; means associated with the outer, lateral surface of the inner receptacle and the outer, lateral surface of the annular member for causing the liquid flowing from the inner receptacle through the outer to descend to the bottom of said eccentric parts of the outer receptacle before said liquid can rise to the top thereof; and a funnel associated with the inner receptacle and having a tubular extension to the bottom thereof substantially as and for the purpose set forth.

In testimony whereof I have signed my name to this specification in the presence of two subscribing witnesses.

FRANK NUNEZ.

Witnesses:
F. M. MOWBRAY,
CHAS. A. REDDEN.

Copies of this patent may be obtained for five cents each, by addressing the "Commissioner of Patents, Washington, D. C."